July 16, 1957 R. G. LEFTWICH 2,799,116
INSECT DESTROYER
Filed Dec. 6, 1954

INVENTOR
ROBERT GILMORE LEFTWICH

BY
ATTORNEYS

United States Patent Office 2,799,116
Patented July 16, 1957

2,799,116

INSECT DESTROYER

Robert Gilmore Leftwich, Lynchburg, Va.

Application December 6, 1954, Serial No. 473,285

6 Claims. (Cl. 43—113)

This invention relates to an insecticide producer and a vapor lamp for treating insects which not only act to attract and trap the insects but also to kill and destroy them.

It is an object of the invention to provide a device which when heat is applied a substance will be vaporized to kill the insects attracted to the device. Another object of the invention is to provide a structure in which escape vents are provided around a crystal containing cup to allow heat to escape with the escaping vapors.

A further object of the invention is to provide a vapor lamp with a reflector cooperating with an outside globe provided with cut-out notches forming openings which can be adjusted to control the flow of the insect treating substance.

With the above and other objects in view which will be apparent as the description proceeds, the invention comprises the novel constructions, combinations and arrangements of parts hereinafter described and illustrated in the accompanying drawings in which.

Figure 1:
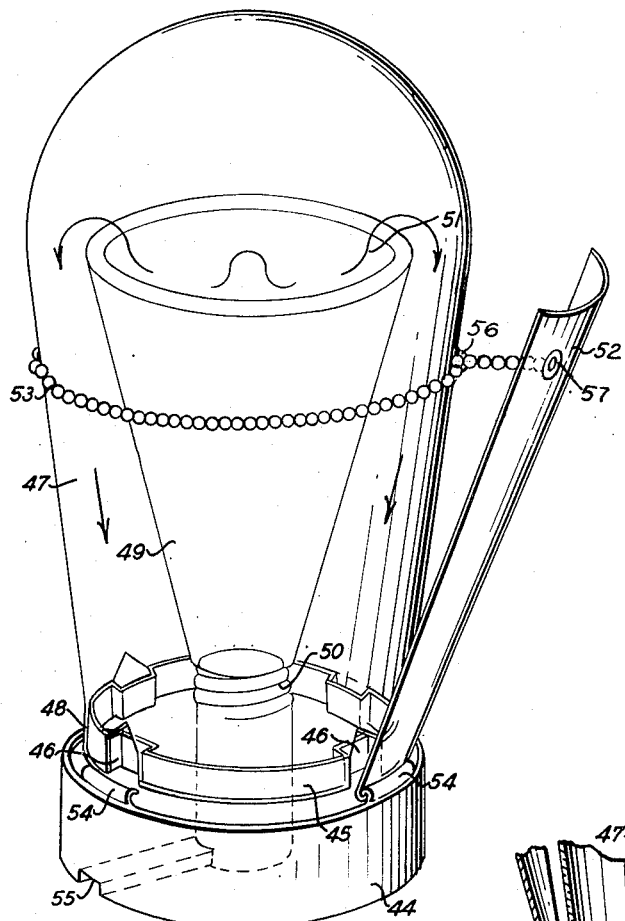
Fig. 1 is a perspective view of the vaporizer.
Figure 2:
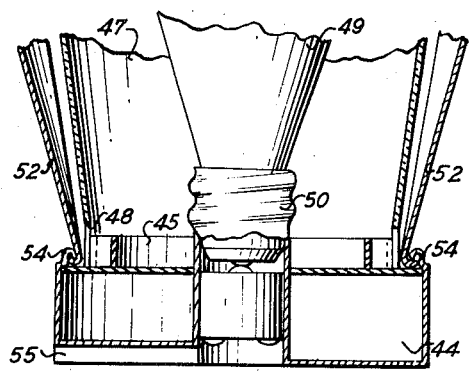
Fig. 2 is a vertical section of the base part of Fig. 1.

Referring to Figs. 1 and 2 a base portion 44 has a circumferential upstanding wall 45 with spaced outlets 46 for the vapor. A globe 47 rests on the base 44 around the wall 45 and is provided with openings 48 corresponding to the outlets 46. The base portion 44 is adapted to receive an electric heater bulb 49 having a screw socket 50 at one end and a crystal receiving cup 51 at the other end. The cup 51 is adapted to receive crystals which are placed therein merely by lifting up and removing the globe 47 which latter is preferably made of glass or plastic. A deflector 52 is secured at each opening or outlet 46 supported by a chain 53 and interfitting at the base to a curved lug 54. The chain 53 surrounds the globe 47 and by means thereof the deflector can be adjusted or removed at 56 if desired. The chain is secured at 57 to the deflector 52. An electric cord, not shown, may pass through passage 55 in the bottom of the base 44.

In operation the apparatus operates in such a way that the crystals are vaporized in the cup 51 so that the vapors follow the arrows out through the outlets 48 and the insects between the globe 47 and the deflectors 52 are subjected to the vapors. By rotating the globe 47 the amount of opening relative to the opening 48 can be adjusted as desired.

It is, of course, obvious that the parts may be made of any suitable materials such as glass, plastics and light metal alloys. Also any type of crystals and chemicals may be used which vaporize with or without heat. The inside of the apparatus is preferably lighted to attract the insects and the deflectors are used not only to trap the insects but also to concentrate the amount of the vaporized chemicals.

As an example of the chemical which may be used may be mentioned gamma isomer of benzene hexachloride but many others are equally effective in the apparatus disclosed herein.

I claim as my invention:

1. An apparatus for attracting and destroying insects comprising a base portion, an electric lamp socket mounted centrally on said base portion, an electric lamp adapted to be secured in the socket and having a chemical receiving depression therein, a globe mounted on the base to extend over the electric lamp and having at least one opening through which the vaporized chemical may pass, and a deflector element mounted on the base adjacent the opening and spaced from the globe to attract insects and concentrate the chemical vapor passing out through the opening.

2. An apparatus for attracting and destroying insects according to claim 1, in which means are provided connected to the globe and the deflector to adjust the distance of the deflector from the globe.

3. An apparatus for attracting and destroying insects according to claim 1, in which means are provided on the base portion and on the deflector to removably connect the deflector on the base portion.

4. An apparatus for attracting and destroying insects according to claim 1, in which means are provided on the base portion and on the deflector to removably connect the deflector on the base portion, and the deflector is in the form of a curved sheet metal plate with a hook portion to cooperate with a corresponding hook portion on the base portion as a part of the last-mentioned means.

5. An apparatus for attracting and destroying insects according to claim 1, in which the base portion is provided with a concentric portion projecting above the base and in which an opening is provided to register with the opening in the globe for the escape of the vapor from the chemical.

6. An apparatus for attracting and destroying insects according to claim 1, in which the base portion is provided with a concentric portion projecting above the base and in which an opening is provided to register with the opening in the globe for the escape of the vapor from the chemical, said globe being rotatably adjustable to change the amount of one opening relative to the other opening.

No references cited.